United States Patent [19]

Wagenfeld

[11] Patent Number: 4,836,469
[45] Date of Patent: Jun. 6, 1989

[54] SYSTEM FOR REDUCING AIRCRAFT NOISE AND HUSH KIT

[75] Inventor: Robert E. Wagenfeld, New York, N.Y.

[73] Assignee: Valsan Partners Limited Partnership, New York, N.Y.

[21] Appl. No.: 55,635

[22] Filed: May 29, 1987

[51] Int. Cl.⁴ .................. B64D 29/00; B64D 33/04
[52] U.S. Cl. ................... 244/1 N; 181/213; 181/220; 181/222; 181/296
[58] Field of Search ............. 244/1 N, 55; 181/213, 181/220, 222, 296

[56] References Cited

U.S. PATENT DOCUMENTS

| | | | |
|---|---|---|---|
| 3,002,341 | 10/1961 | Muzzy et al. | 181/220 |
| 3,237,891 | 3/1966 | Wotton | 244/55 |
| 4,379,191 | 4/1983 | Beggs et al. | 52/806 |
| 4,456,204 | 6/1984 | Hapke | 244/55 |
| 4,723,626 | 2/1988 | Carr et al. | 181/213 |

OTHER PUBLICATIONS

"Silencing an Executive Jet Aircraft", Noise Control Engineering, vol. 5, No. 2, Sep.–Oct. 1975, J. R. Brooks, et al.
"Quieting the JT3D Powered 707", Sound and Vibration, vol 8, No. 2, Feb. 1974, J. Woodall.

Primary Examiner—Galen Barefoot
Assistant Examiner—Rodney Corl
Attorney, Agent, or Firm—Cooper & Dunham

[57] ABSTRACT

A system is provided for existing three-engine jet aircraft to reduce the noise levels at take-off and landing in order to meet governmental noise regulations. The system is particularly suitable for 727-200 aircraft having three JT8D engines. A hush kit is formed of the modified components for installation in existing airplanes.

4 Claims, 4 Drawing Sheets

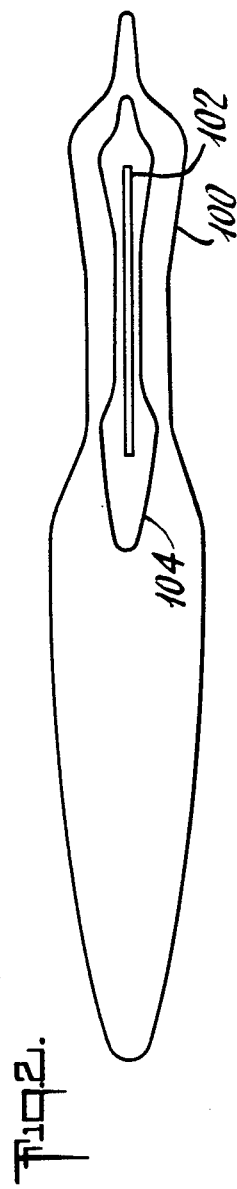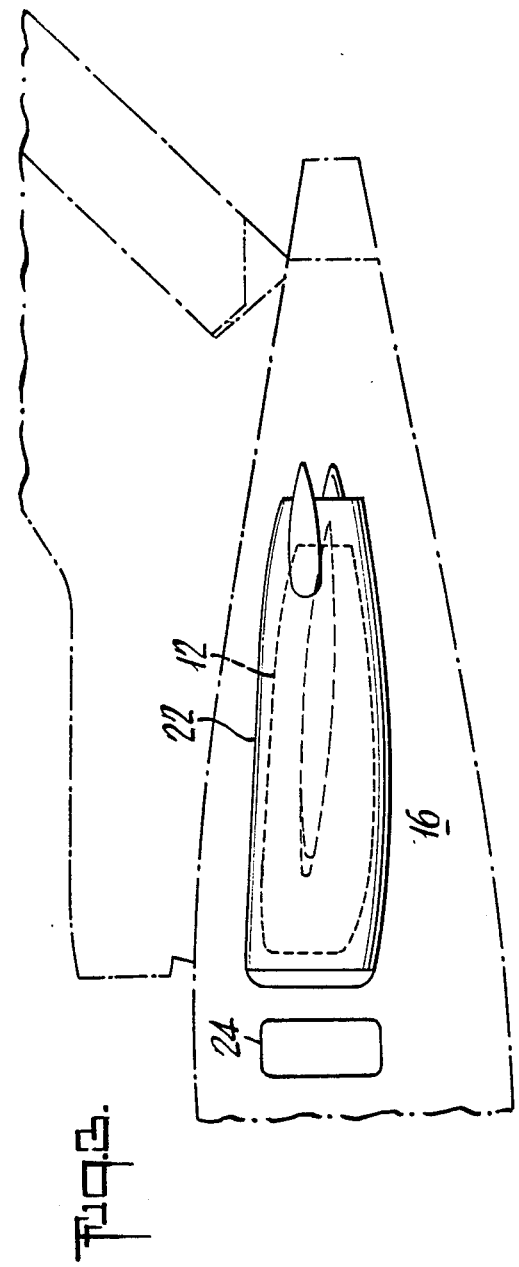

SYSTEM FOR REDUCING AIRCRAFT NOISE AND HUSH KIT

BACKGROUND OF THE INVENTION

Prior to 1969, the aircraft industry paid little concern to commercial jet aircraft engine noise. In Dec. 1969, the U.S. Federal Aviation Administration ("FAA") promulgated specific noise level regulations for aircraft under authority of public Law 90-411. Existing airplanes were required to be certificated for compliance with Federal Air Regulation No. 36 ("FAR 36"). Similar noise standards were prescribed by international civil aviation organizations (for example, "ICAO Annex 16"). Several states and municipalities also established maximum airport noise levels. Thus, it became imperative for airframe and engine manufactures and owners to take noise considerations into account in designing, building and using jet aircraft.

In the 1970's, The Boeing Co. conducted research to determine how noise levels could be reduced upon the take-off and landing of its various models of commercial airplanes. Boeing, of course, was concerned with design of future airplanes to meet more stringent noise standards, although it was also interested in modifications to currently operated aircraft to meet current noise standards.

With respect to its Model 727 aircraft with pratt & Whitney JT8D engines, Boeing proposed to treat the nacelles for the jet engines with sound-attenuating material. Boeing suggested adding the material to the inlet cowl, on some of the engine ducts and to the tailpipe. It was suggested that the treatment would reduce high-frequency fan noise, but would have virtually no effect on low-frequency jet rumble during take-off. Other modifications attempted by Boeing were reported to severely degrade airplane performance.

With respect to its Model 737 aircraft with Pratt & Whitney JT8D engines, Boeing proposed similar sound-attenuating treatment. Boeing further suggested using a mixer device to mix the air flow from the fan with the air flow through the engine to reduce the peak jet velocity and thus the jet noise from the engine. Boeing reported its test results in its "Summary 707-727-737-747 Noise and Emission Reduction Activities", April 1980, Document D6-40613-K.

Thereafter, the major airplane manufacturers and others continued substantial research effort toward developing retrofit kits for existing airplanes to attempt to meet FAR 36 noise level requirements. However, it was difficult to develop a kit which would meet FAR 36, Stage 2, requirements without, at the same time, degrading aircraft performance, increasing fuel consumption and unreasonably increasing costs. Although the effective date of the FAR 36 noise requirement was extended on several occasions, and the requirement was modified, FAR 36, Stage 2, went into effect on JUN. 1, 1985. Implementation of that regulation affected the usefulness and value of many existing aircraft, including particularly Douglas DC-8 airplanes with Pratt & Whitney JT3D engines. Aeronautic Development Corp. Ltd. was successful in devising a quiet nacelle system and hush kit to make those airplanes economically viable. That system and hush kit is shown in allowed application Ser. No. 06/769,141, now U.S. Pat. No. 4,723,626.

Many municipalities and airports have now adopted the more stringent FAR 36, Stage 3, noise level requirements. Those regulations affect the usefulness and value of a much greater number of aircraft, including particularly Boeing 727-200 aircraft having Pratt & Whitney JT8D engines. About 1,700 of those airplanes currently are in operation. Heretofore, no one has successfully developed a system and hush kit to extend the useful life of those airplanes.

It is a difficult task to make those existing airplanes meet the stage 3 noise level requirements. Studies which have been conducted show that noise radiates from a low bypass, fan jet engine in several directions. High-frequency fan noise radiates both forward though the air inlet cowl and afterward through the exhaust ducts. Low-frequency jet noise generally radiates rearwardly. At low engine thrust, the high-pitch whine of the fan is more pronounced. At high engine thrust, the low-pitch jet rumble is more noticeable. Each of those noise components must be dealt with separately, as well as in combination. But, making a modification to suppress noise may also severely degrade airplane performance, substantially increase final consumption, require longer runways for take-offs or landings, mandate lesser payloads or otherwise greatly increase costs or require operational limitations.

SUMMARY OF THE INVENTION

One object of the present invention is to provide a system which will permit three-engine jet aircraft to take-off and land at noise levels which meet FAR 36, Stage 3, and ICAO Annex 16, Chapter 3, requirements.

Another object of the invention is to provide a system for three-engine jet aircraft which permits operation at a quiet level conforming with more stringent governmental airplane noise regulations, while maintaining cost-effective performance and providing at least no greater fuel consumption.

Still another object of the invention is to provide a retrofit or hush kit for existing three-engine jet aircraft which will permit continued operation of airplanes which otherwise would not comply with governmental noise regulations and thus could not be flown, at least on a cost-effective basis.

In accordance with the system of the present invention, an airplane is modified so as to comply with FAR 36, Stage 3, and ICAO Annex 16, Chapter 3, noise regulations. The system comprises replacement of the two existing outboard jet engines with new engines, including the associated nacelles, thrust reversers, struts and other structural support. The existing center engine is retained, but is fitted with an internal forced air mixer and acoustically treated nozzle, in lieu of a center engine cascade thrust reverser, which is removed.

The system is particularly useful in the modification of existing Boeing Model 727-200 aircraft having Pratt & Whitney JT8D-7/9/15/17 engines. However, the system also may have applicability to other aircraft and other jet engines. The components of the system may be combined in a hush kit for retrofitting existing airplanes.

DESCRIPTION OF THE DRAWINGS

FIG. 2 is a graphic depiction of the reduced noise level contour achieved by the present invention, as compared to the noise level contour of an unmodified aircraft.

FIG. 3 is a side elevational view of a nacelle for one outboard engine of the modified aircraft, as compared to a nacelle of an unmodified aircraft.

DETAILED DESCRIPTION OF THE INVENTION

Figure 1:
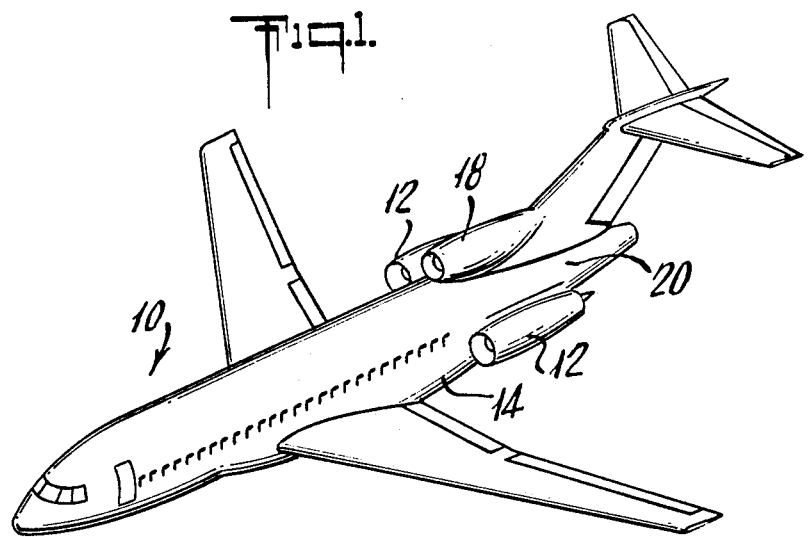
FIG. 1 is a perspective view of a Boeing 727-200 aircraft as modified in accordance with the system of the present invention.

Generally, as shown in FIG. 1 of the drawings, the present invention relates to a jet airplane 10 having two outboard nacelles 12, supported on the sides of the fuselage 14 by support struts 16, and a center nacelle 18 mounted on the empannage 20. Each nacelle contains a jet engine adapted to propel the airplane 10. As modified in accordance with the system of the present invention, the airplane should operate at noise levels which meet stringent governmental noise regulations, including FAR 36, Stage 3, and ICAO Annex 16, Chapter 3, without losing airworthiness and structural integrity, and without cost-reducing restrictions regarding runway length, take-off thrust, or payload reduction.

Figure 4:
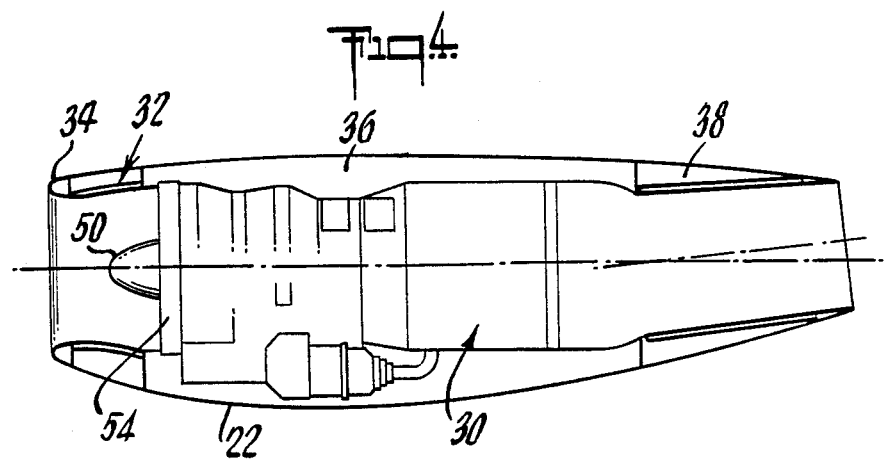
FIG. 4 is a cross-sectional elevational view of a modified outboard nacelle containing a JT8D-217C/219 jet engine.

The invention contemplates replacement of the existing outboard engines and nacells 12. Thus, the nacelles 12 are removed and new, larger nacells 22 are installed. The difference in respective sizes is shown in FIG. 3. However, the larger nacelles 22 must be positioned so as to leave clearance for the aft cabin door 24. A JT8D-217/219 engine 30 is mounted in each outboard nacelle 22 to replace the existing JT8D-7/17 engines, as shown in FIG. 4. The newer engines have a larger fan, and different high and low-pressure compressors. The newer engines are quieter than the older engines, but still not to an extent sufficient to meet the Stage 3 noise level requirements. Other than as described herein, the nacelle elements are standard components known to those skilled in the art.

As best seem in FIG. 4, each outboard nacelle 22 is modified to include sound-attenuation material 32 in selected portions of the nacelle. It has been found that it is most efficient used to use the sound-attenuation material 32 on the nose cowl 34 defining the inlet to the nacelle, the forward and aft cowls 36 circumscribing the engine and the exhaust nozzle 38, as well as on some of the bulkheads.

Figure 5:
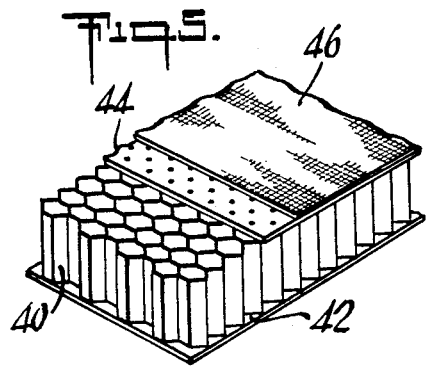
FIG. 5 is a perspective view, partially cut-away of the sound-attenuating material used in the nacelle.

The sound-attenuating material 32 which has been found particularly effective for the purpose of the present invention is a single-layer "DynaRohr" liner material made by Rohr Industries, Inc. That material is shown and described, for example, in U.S. Pat. No. 4,379,191, the disclosure of which is incorporated herein by reference. The acoustic liners may be fabricated of many materials and in different sizes and strengths, depending upon specific operating conditions. As shown in FIG. 5, the sound-attenuating material preferably comprises a plurality of honeycomb core cells 40, sandwiched between a solid aluminum sheet 42 and a perforated aluminum sheet 44. A woven wire mesh 46 covers the perforated sheet 44 and forms a smooth surface for laminar airflow. The honeycomb core cells 40 communicate with the atmosphere through the perforated sheet 44 and the woven wire mesh 46. As is known to those skilled in the art, material of this type may be tuned to particular noise frequencies to provide effective acoustic performance. The particular preferred material also provides aerodynamic smoothness and structural integrity. The smooth surface avoids drag, which impedes performance and increases fuel consumption. The acoustic material gives linear performance and is a broadband noise absorber. The material is sometimes referred to as a "liner", but in fact is a structural substitute for a solid duct wall and is structurally integrated with the other nacelle components.

Figure 6:
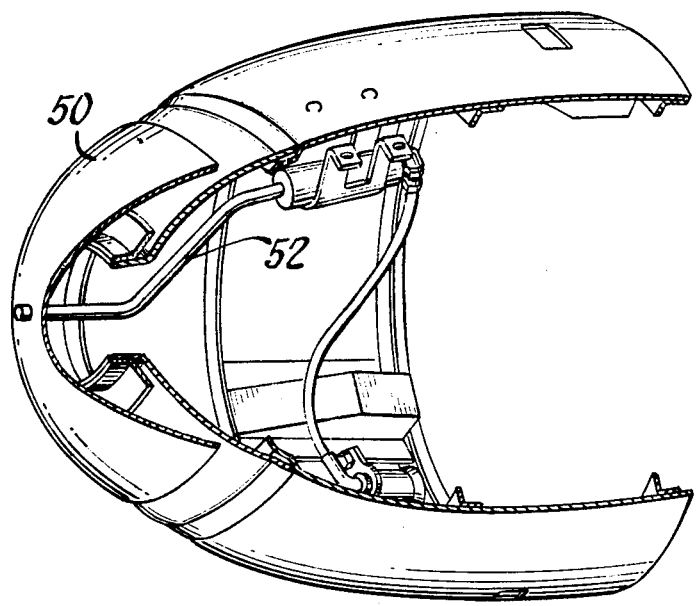
FIG. 6 is a perspective view, partially cut-away, of the nose dome within the nacelle.

The nose dome 50 of the modified nacelle 22 is shown in FIG. 6. The nose dome contains an anti-icing system 52 to prevent the build-up of ice during flight. The nose dome is bullet shaped and is positioned in front of the engine fan 54, as shown in FIG. 4.

Figure 7:
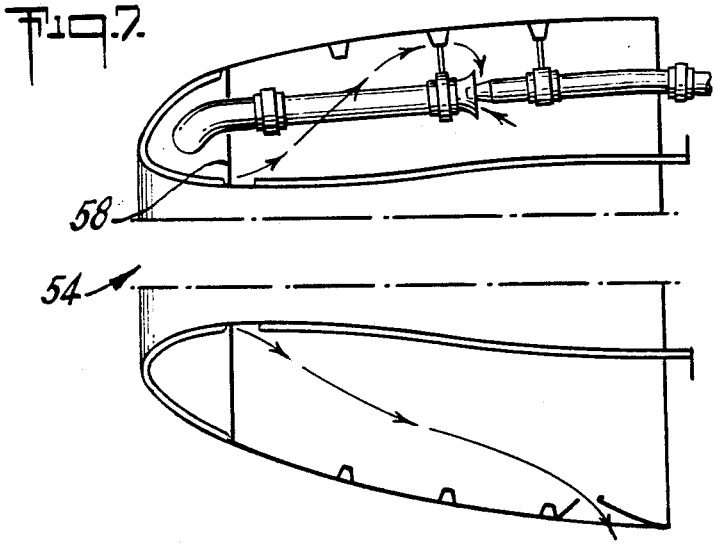
FIG. 7 is a cross-sectional elevational view of the inlet cowl of the nacelle.

The inlet cowl 34 of the modified nacelle 22 is shown in FIG. 7. An anti-icing system 58 also is installed in the inlet cowl. The inlet cowl 34 is configured to cooperate with the nose dome 50 to provide a smooth flow of air through the inlet to the fan 54 and thence through and around the engine 30.

Figure 8:
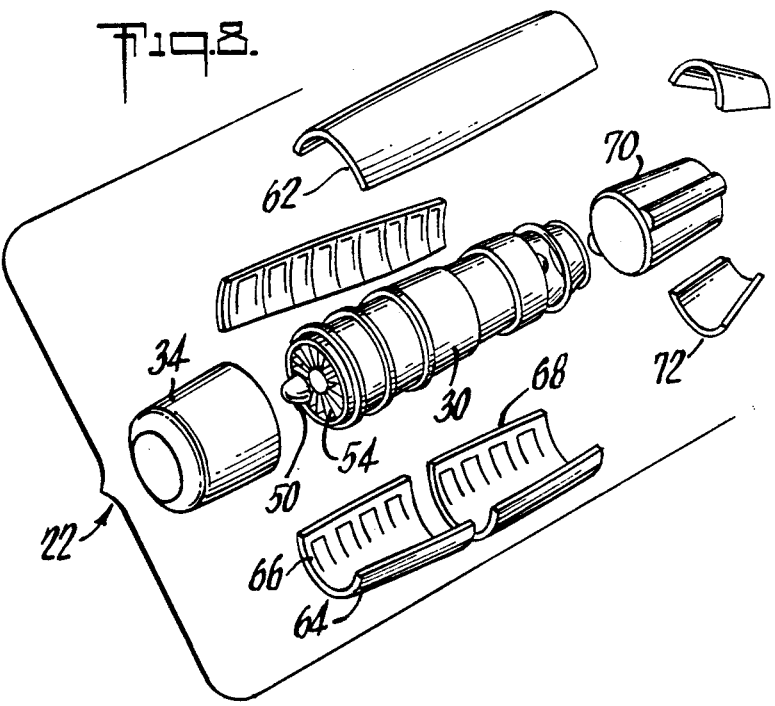
FIG. 8 is an exploded, perspective view of a modified outboard nacelle showing the engine.

An exploded view of each modified outboard nacelle 22 is shown in FIG. 8. The jet engine 30 is mounted within the nacelle. As is conventional with such engines and nacelles, the inlet cowl 34 containing the deicing system 58 is at the front of the nacelle. Upper and lower cowls 62,64 surround the engine 30. The lower cowl 64 is comprised of forward and aft sections 66,68. The nose dome 50 containing the deicing system 52 is fitted in front of the engine fan 54 to provide for smooth air flow. A thrust reverser 70 and exhaust nozzle 72 are mounted at the rear of the engine.

Because the outboard nacelles 22 and engines 30 are larger and heavier in the modified system than those in the existing airplane, it is necessary to use struts 16 to connect the necelles to the fuselage 14 which can carry more weight. Portions of the aft fuselage also must be strengthened. The replacement jet engines 30 develop about 10,000 pounds more thrust than the original engines. The overall thrust produced by the two outboard engines is of the same magnitude as the thrust produced by the three original engines.

It has been found to be impractical to replace the center nacelle 18 and center engine of the airplane. The modified outboard nacelle and engines are large and heavier and would not fit into the space left by the removed center nacelle 18. Accordingly, it is a feature of the invention that the center nacelle and engine are left in place and modified, rather than removed. The modified center nacelle 18 and engine, together with the replacement outboard nacelles 22 and engines, are sufficient to reduce the noise levels to an extent meeting the FAR 36, Stage 3, requirements. As the thrust produced by the two new outboard engines is substantially greater than that of the replaced engines, it is not necessary to have a thrust reverser on the center engine, and the thrust reverser is removed.

Figure 9:
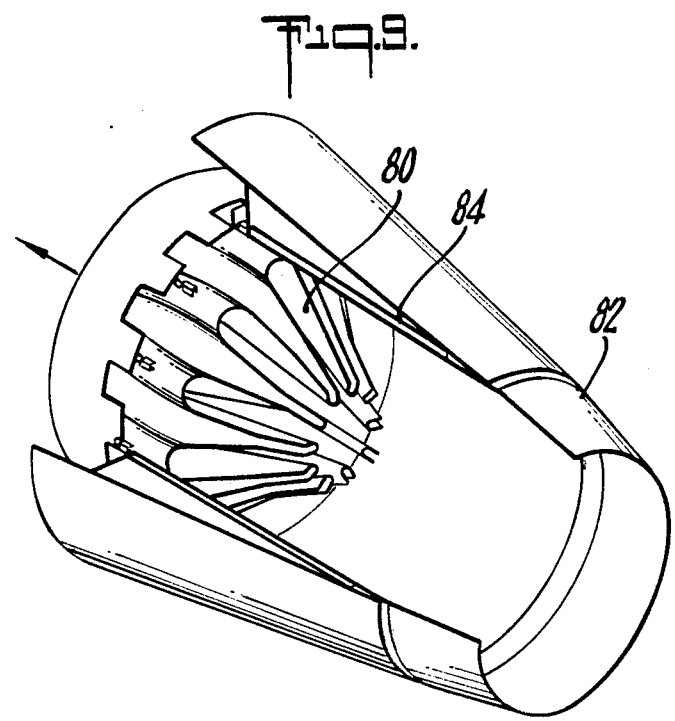
FIG. 9 is a perspective view, partially cut-away, of the mixer and acoustic nozzle within the center nacelle.

In the position vacated by the thrust reverser, as shown in FIG. 9, there is mounted a forced-air mixer 80. The scalloped-shaped mixer combines the hot air passing through the center engine with colder air passing around the engine. A mixer developed by Pratt & Whitney for JT8D engines installed on Boeing 737 airplanes has been found suitable for this purpose. Behind the mixer in the nacelle, a nozzle 82 is mounted. The nozzle or tailpipe is lined with sound-attenuating material 84, such as that shown in FIG. 5.

The system of the invention has been found to be effective in reducing noise levels to the extent necessary to meet FAR 36, Stage 3, requirements. As shown in FIG. 2, an unmodified Boeing 727-200 produces a noise contour or "footprint" about a runway 102. Use of the system of the invention result in a far smaller footprint 104. The contours shown are with a take-off weight of 197,000 lb.

FAR 36, Stage 3, requires that the noise generated be substantially less than in Stage 2. Applicant's system will reduce the noise level on take-off from 102.5 EPNdB to 93.0 EPNdB ("effective perceived noise"); sideline noise from 104.2 EPNdB to 97.4 EPNdB, with center engine take-off thrust at 90% of normal power and outboard engines at 100% of normal power; and approach noise from 106.2 EPNdB to 100.7 EPNdB at 40° flaps, and to 97.4 EPNdB at 30° flaps. It should be appreciated that a variance of less than 2 EPNdB at any position will still meet the requirement. It should also be appreciated that a noise reduction of 10 EPNdB corresponds to a reduction of 50% in the total perceived noise level.

As a bonus, it is believed that the system will improve fuel economy by about 12 to 18%, and increase maximum range by about 300 nautical miles for standard day operation. An airplane equipped with the system requires a runway at least about 17% shorter for take-off, if the center engine is operated at full power. In one test, the runway needed was about 5,650 ft., as opposed to 8,200 ft. for a conventional airplane. Time to climb to the desired flight altitude is reduced by about 23%. The maximum take-off weight and landing weight are about the same.

The invention is advantageously packaged in the form of a hush kit, which can be used to retrofit existing aircraft. A "hush kit" is a collection of replacement or substitute components which, when combined and installed on an airplane, enable that airplane to operate at lower noise levels. In the present invention, the hush kit comprises the two outboard nacelles 22, each containing a JT8D engine 30, the forced-air mixer 60 for replacing the thrust reverser on the center engine, and the acoustic nozzle 82 for mounting aft of the mixer on the center engine. The hush kit also contains, of course, the associated struts, engine mounts, structural reinforcements and other hardware necessary to install and assemble the hush kit components. Whenever a system is changed, instrumentation, controls, electrical and hydraulic system need to be modified, as will be apparent to those skilled in the art.

It should be appreciated that the invention is particularly applicable to a three-engine jet aircraft, such as Boeing 727-200 airplanes, having Pratt & Whitney JT8D engines. However, those skilled in the art will understand that the system of the invention also is applicable to other aircraft and engines by modifications which do not depart from the spirit and scope of the invention.

I claim:

1. A method for quieting jet engine noise produced by an airplane having three jet engines upon take-off and landing, comprising:
    (a) replacing two outboard-mounted jet engines at the rear of the fuselage with jet engines which produce lower noise and greater thrust;
    (b) retaining a center fuselage-mounted jet engine, and removing a thrust reverser from the aft position thereof;
    (c) mounting a forced-air mixer on the center engine at the position from which the thrust reverser was removed, the mixer being adapted to combine cold air passing around the engine with hot air passing through the engine, to reduce engine noise emitted by the center engine; and
    (d) mounting an acoustic nozzle comprised of sound-attenuating material aft of the forced-air mixer on the center engine,
whereby the noise level produced the airplane is reduced to a sufficiently quiet level to meet governmental noise regulations while remaining airworthy and permitting operation without reduced payloads or thrust.

2. A method as in claim 1 further comprising replacing two outboard-mounted nacelles with larger nacelles to accommodate the two replaced outboard-mounted jet engines at the rear of the fuselage.

3. A method as in claim 2 further comprising fitting heavier struts for the two replacement outboard-mounted nacelles for the two outboard-mounted jet engines at the rear of the fuselage.

4. A hush kit for adapting a jet airplane having two jet engines mounted on the rear of the fuselage and one jet engine mounted on the empennage, so as to meet governmental noise level regulations, comprising:
    (a) two nacelles adapted to be mounted to the rear sides of the fuselage, each containing a jet engine having lower noise and greater thrust then the outboard mounted jet engines on the airplane;
    (b) means adapted for mounted the nacelles to the fuselage;
    (c) a forced-air mixer adapted to be fitted to the empennage-mounted jet engine; and
    (d) a nozzle lined with sound-attenuating material on the airflow surfaces thereof and adapted to be mounted aft of the forced-air mixer,
whereby the components of the kit are adapted to be substituted for existing components of the airplane to facilitate reduction of engine noise during take-off and landing of the airplane.

* * * * *